(12) United States Patent
Jeong et al.

(10) Patent No.: US 10,505,209 B2
(45) Date of Patent: Dec. 10, 2019

(54) METHOD AND APPARATUS FOR CONTROLLING FUEL CELL COOLING

(71) Applicants: HYUNDAI MOTOR COMPANY, Seoul (KR); KIA MOTORS CORPORATION, Seoul (KR)

(72) Inventors: Seong Cheol Jeong, Suwon-si (KR); Dong Hun Lee, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 211 days.

(21) Appl. No.: 15/670,820

(22) Filed: Aug. 7, 2017

(65) Prior Publication Data

US 2018/0254500 A1    Sep. 6, 2018

(30) Foreign Application Priority Data

Mar. 3, 2017   (KR) ........................ 10-2017-0027807

(51) Int. Cl.
*H01M 8/04701* (2016.01)
*H01M 8/0432* (2016.01)
*H01M 8/04992* (2016.01)
*H01M 8/04029* (2016.01)
*H01M 8/04014* (2016.01)
*H01M 8/04007* (2016.01)
*H01M 8/04664* (2016.01)

(52) U.S. Cl.
CPC ... *H01M 8/04701* (2013.01); *H01M 8/04007* (2013.01); *H01M 8/04014* (2013.01); *H01M 8/04029* (2013.01); *H01M 8/0432* (2013.01); *H01M 8/04679* (2013.01); *H01M 8/04992* (2013.01); *H01M 2250/10* (2013.01); *H01M 2250/20* (2013.01); *Y02B 90/14* (2013.01); *Y02T 90/32* (2013.01)

(58) Field of Classification Search
CPC ......... H01M 2250/10; H01M 2250/20; H01M 8/04014; H01M 8/04029; H01M 8/0432; H01M 8/04701; H01M 8/04992
See application file for complete search history.

(56) References Cited

U.S. PATENT DOCUMENTS

| | | | | |
|---|---|---|---|---|
| 3,595,699 A | * | 7/1971 | Baude | H01M 8/04007 165/300 |
| 6,651,761 B1 | * | 11/2003 | Hrovat | H01M 8/04014 165/41 |
| 2006/0063048 A1 | * | 3/2006 | Kolodziej | H01M 8/04029 429/430 |
| 2006/0125441 A1 | * | 6/2006 | Kolodziej | H01M 8/04305 320/101 |

FOREIGN PATENT DOCUMENTS

| | | |
|---|---|---|
| JP | 2015-002098 A | 1/2015 |
| JP | 5763483 B2 | 8/2015 |
| KR | 10-1282622 B1 | 7/2013 |
| KR | 10-1610392 B1 | 4/2016 |

\* cited by examiner

*Primary Examiner* — Carlos Barcena
(74) *Attorney, Agent, or Firm* — Morgan, Lewis & Bockius LLP

(57) ABSTRACT

A method and an apparatus are provided for controlling a cooling system of a fuel cell, wherein an output of the cooling system is determined by varying rising/falling gain values of a cooling system according to irreversible/reversible degradation degrees of the fuel cell and an output demand degree, whereby the cooling system is controlled according to the determined output.

12 Claims, 3 Drawing Sheets

METHOD AND APPARATUS FOR CONTROLLING FUEL CELL COOLING

CROSS REFERENCE TO RELATED APPLICATION

The present application is based on and claims the benefit of priority to Korean Patent Application No. 10-2017-0027807, filed on Mar. 3, 2017, the entire contents of which is incorporated herein for all purposes by this reference.

TECHNICAL FIELD

The present disclosure generally relates to a method of controlling fuel cell cooling, wherein the method ensures operability and durability of the fuel cell by providing cooling that is controlled according to irreversible/reversible degradation degrees of the fuel cell and changes in driver's output demands.

BACKGROUND

Fuel cells refer to power generation systems that convert chemical energy of fuels into electric energy by electrochemically reacting fuel in cell stacks through combustion rather than the fuel being converted into heat. Fuel cells may be used for supplying power for industry, households and vehicles. In addition, fuel cells may be applied as power supplied for small electric/electronic devices, especially for portable devices.

Fuel cell systems measure temperature and control the temperature according to the measured temperature to improve system efficiency, to ensure the systems, and to improve durability of the fuel stacks in the long-term. For this, cooling performance is ensured by controlling RPMs of a cooling water pump and a cooling fan for stack cooling.

Herein, the cooling water pump and the cooling fan RPMs may be calculated by using a fixed RPM operational method based on temperature of a cooling water output from the fuel stack, or by using PI control methods that have a fixed gain value within a predetermined temperature range. Herein, fixed RPMs or fixed gains of PI control methods are determined by parameters that are initially tuned to the fuel cell system.

However, it is difficult for conventional methods using fixed RPMs that are initially tuned or methods applying fixed gains to respond phenomenon such as irreversible degradation or dry-out/flooding that occurs in the short term.

In addition, it is difficult for methods of applying fixed gains that are initially tuned to respond to changes in output demands that are changed in real time by a driver.

In addition, there is limit for RPM instruction values that are determined based on only temperature, which is the resultant phenomenon caused by changes in output demand of the driver, to active responses due to stack heat generation. In addition, feed-forward situations caused by heat and sudden temperature changes may frequently occur, and such situations may cause deterioration of system efficiency due to excessive RPM operation.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind the above problems occurring in the related art, and the present invention is intended to propose method and apparatus for controlling fuel cell cooling, which ensures operability and durability of a fuel cell by varying a gain value of a cooling system according to irreversible/reversible degradation degrees of the fuel cell and changes in output demands.

In order to achieve the above object, according to one aspect of the present disclosure, there is provided a method of controlling fuel cell cooling, the method including: deriving an output demand degree of a fuel cell or a degradation degree of the fuel cell; deriving a gain value according to the derived output demand degree of the fuel cell or the degradation degree of the fuel cell for controlling a cooling system that performs fuel cell cooling; determining an output of the cooling system by applying the derived gain value; and controlling the cooling system according to the determined output.

The gain value may be configured with a rising gain value and a falling gain value that are applied for increasing and decreasing the output of the cooling system, respectively.

The method may further include: deriving a stack temperature of the fuel cell before the deriving of the gain value, wherein in the determining of the output of the cooling system, the rising gain value may be applied when the derived stack temperature is higher than a target temperature, and the falling gain value may be applied when the derived stack temperature is lower than the target temperature.

The deriving of the degradation degree of the fuel cell may include: deriving a reversible degradation degree and an irreversible degradation degree, and the deriving of the gain value may include: deriving the gain value by independently using the reversible degradation degree and the irreversible degradation degree.

The deriving of the gain value may include: increasing a rising gain value that is applied for increasing the output of the cooling system when the derived irreversible degradation degree is higher than a reference irreversible degradation degree.

The deriving of degradation the degree of the fuel cell may include: deriving a dry-out degree as the reversible degradation degree, and the deriving of the gain value may include: increasing a rising gain value that is applied for increasing the output of the cooling system when the derived dry-out degree is higher than a reference dry-out degree.

The deriving of the fuel cell degradation degree may include: deriving a flooding degree as the reversible degradation degree, and the deriving of the gain value may include: increasing a falling gain value that is applied for decreasing the output of the cooling system when the derived flooding degree is higher than a reference flooding degree.

The deriving of the gain value may include: deriving a rate of change in output demand as the output demand degree of the fuel cell; and increasing a rising gain value that is applied for increasing the output of the cooling system when the derived rate of change in the output demand is higher than a reference rate.

The deriving of the gain value may include: deriving a rate of change in output demand as the output demand degree of the fuel cell; and increasing a falling gain value that is applied for decreasing the output of the cooling system when the derived rate of change in the output demand is lower than the reference rate.

The method may further include: deriving a stack temperature of the fuel cell before the deriving of the gain value, wherein when the derived stack temperature is higher than a preset temperature, the falling gain value may be increased relatively less than when the derived stack temperature is lower than the preset temperature.

In the deriving of the gain value, the gain value may be changed when the derived output demand degree of the fuel cell or the degradation degree of the fuel cell exceeds a predetermined threshold range.

The rising gain value and the falling gain value may be derived by using the following formulas:

rising gain value=rising factor×(irreversible degradation degree+dry-out degree+rate of change in output demand)+basic rising gain value;

falling gain value=falling factor×(flooding degree+ rate of change in output demand)+basic falling gain value;

wherein the rising factor and the falling factor refer to weighted values that vary the gain value according to the irreversible/reversible degradation degrees and the rate of change in output demand, and when the rate of change in output demand is positive, the rate of change in output demand is applied to the formula for calculating the rising gain value, and when the rate of change in output demand is negative, the absolute value thereof is applied to the formula for calculating the falling gain value.

An apparatus for controlling fuel cell cooling may include: a cooling system configured to heat up or cool down a fuel cell; a first processor configured to derive an output demand degree of the fuel cell; a second processor configured to derive a degradation degree of the fuel cell; and a controller configured to derive a gain value according to the derived output demand degree of the fuel cell or the degradation degree of the fuel cell for controlling the cooling system that cools down the fuel cell, determining an output of the cooling system by using the derived gain value, and controlling the cooling system according to the determined output.

The apparatus may further include a temperature sensor configured to derive a stack temperature of the fuel cell.

According to a method and an apparatus for controlling fuel cell cooling, the following effects may be obtained.

First, active responses to short-term and long-term apparatus changes may be available by varying and applying a gain value using an irreversible degradation factor and a reversible degradation factor.

Second, problems such as rapid temperature changes caused by heat increase due to an irreversible degradation, and dry-out, thermal damages, and acceleration performance degradations due to a current limit, etc. may be overcome.

Third, rapid degradations due to carbon corrosion may be overcome since over cooling situations during flooding are overcome.

Fourth, changes in driver's output demands may be responded in advance to ensure cooling performance in advance, thereby apparatus efficiency may be improved by minimizing feed-forward situations.

BRIEF DESCRIPTION OF THE DRAWINGS

The shove and other objects, features, and other advantages of the present disclosure will be more clearly understood from the following detailed description when taken in conjunction with the accompanying drawings, in which.

DETAILED DESCRIPTION

Figure 1:
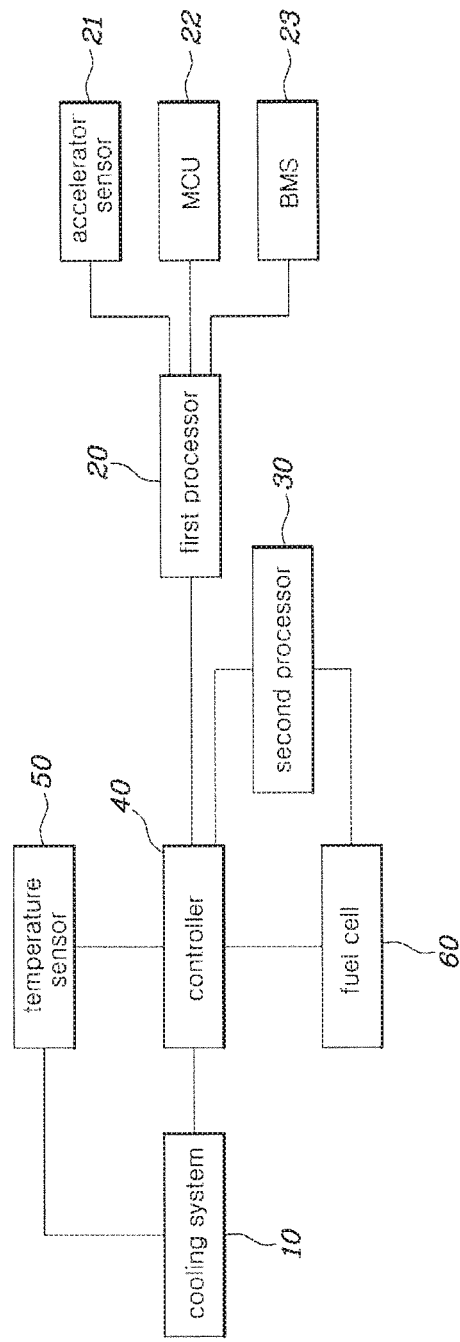
FIG. 1 is a configuration diagram of a fuel cell cooling control apparatus according to an embodiment of the present disclosure.
Figure 2:
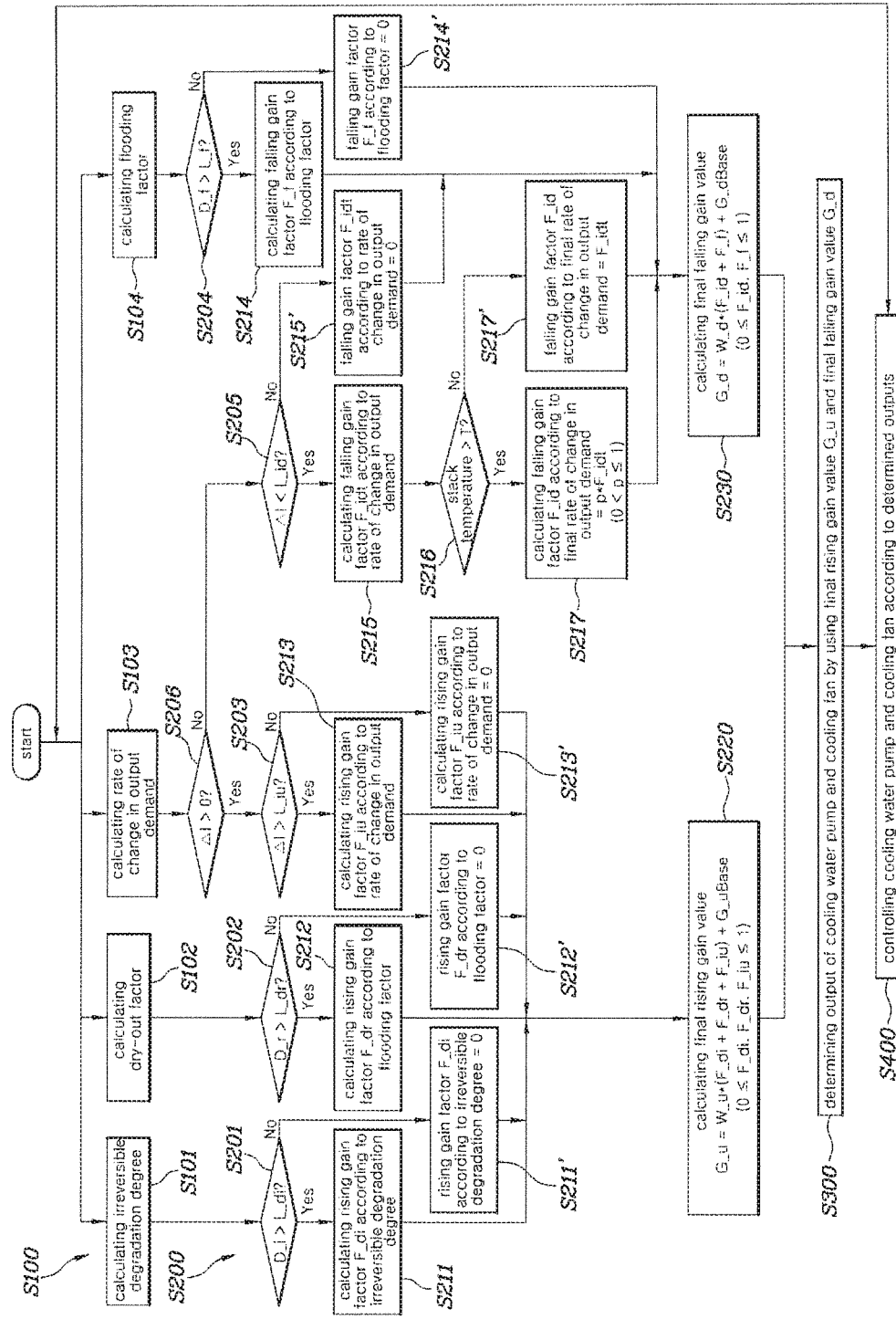
FIG. 2 is a flowchart showing a fuel cell cooling control method according to an embodiment of the present disclosure.
Figure 3:
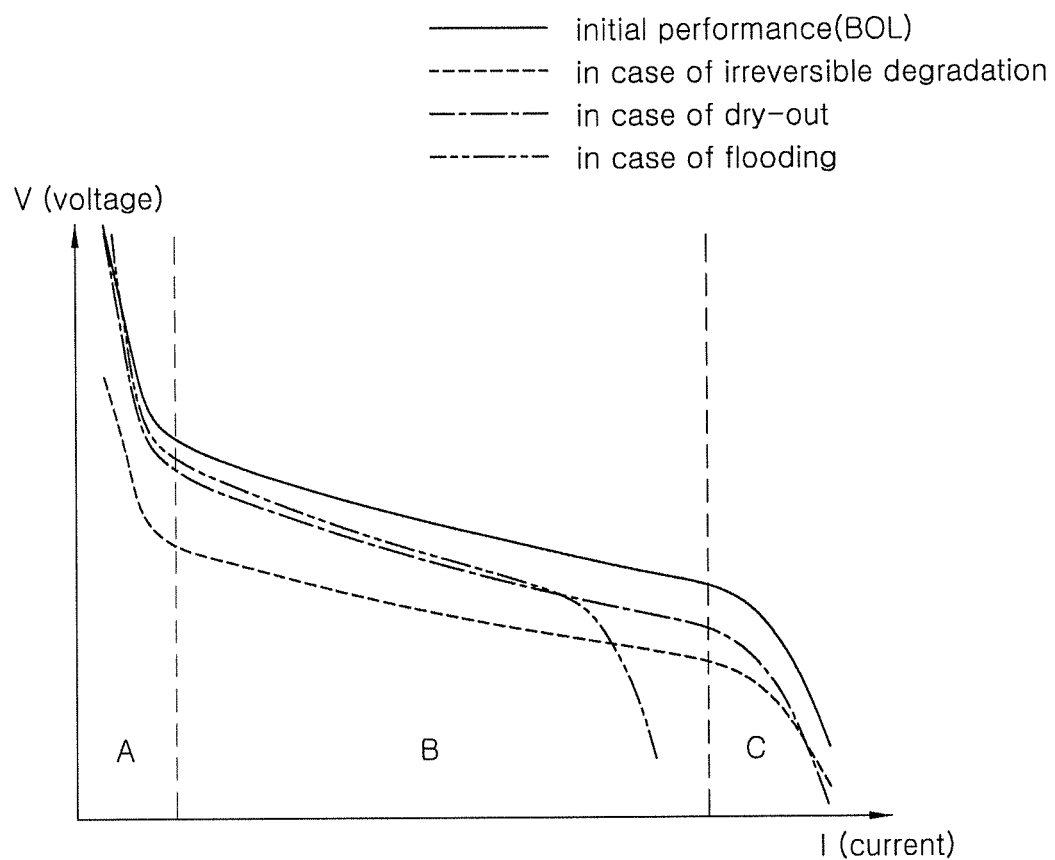
FIG. 3 is a graph showing changes in I-V curves according to types of fuel cell degradation.

Hereinbelow, exemplary embodiments of the present disclosure will be described in detail with reference to the accompanying drawings. FIG. 1 is a configuration diagram of a fuel cell cooling control apparatus according to an embodiment of the present disclosure, FIG. 2 is a flowchart showing a fuel cell cooling control method according to an embodiment of the present disclosure, and FIG. 3 is a graph showing changes in I-V curves according to types of fuel cell degradation.

Referring to FIG. 1, a fuel cell cooling control apparatus according to an embodiment of the present disclosure includes: a cooling system 10 that heats up or cools down a fuel cell 60; a first processor 20 that derives an output demand degree of the fuel cell 60; a second processor 30 that derives a degradation degree of the fuel cell 60; and a controller 40 that derives a gain value for controlling the cooling system 10 according to the output demand degree of the fuel cell 60 or the degradation degree of the fuel cell 60, determines an output of the cooling system 10 by applying the derived gain value, and controls the cooling system 10 according to the determined output.

In addition, the fuel cell cooling control apparatus may further include: a temperature sensor 50 that derives a stack temperature. Herein, the stack temperature may be directly measured, or may be derived by measuring cooling water in an output terminal of the stack as shown in the figure. Since the cooling water discharged from the stack may refer to a temperature of the stack itself, a temperature of the fuel cell stack may be determined by the temperature of the discharged cooling water.

Meanwhile, the cooling system 10 of the present disclosure may be a device for removing heat generated in the fuel cell 60 and includes a cooling water pump used for circulating the cooling water and a cooling fan for heat exchange via a radiator. Therefore, controlling an RPM of the cooling system 10 may be understood as controlling an RPM of the cooling water pump or the cooling fan.

FIG. 2 is a flowchart showing a fuel cell cooling control method according to an embodiment of the present disclosure. Referring to FIG. 2, the fuel cell cooling control method according to the embodiment of the present disclosure may include: deriving an output demand degree of the fuel cell or a degradation degree of the fuel cell, S100; deriving a gain value for controlling the cooling system that cools down the fuel cell according to the derived output demand degree of the fuel cell or the derived degradation degree of the fuel cell, S200; determining an output of the cooling system by applying the derived gain value, S300; and controlling the cooling system according to the determined output, S400.

According to the above fuel cell cooling control method, instead of simply controlling the fuel cell cooling system by reflecting a temperature of the fuel cell and using a fixed gain value, the fuel cell cooling system is controlled by varying the gain value according to the output demand degree of the fuel cell or the degradation degree of the fuel cell. Accordingly, it is possible to prevent the fuel cell from being severely deteriorated in advance and to actively respond to apparatus changes, thereby increasing durability and responsiveness of the fuel cell.

In addition, the fuel cell cooling controlling method according to the embodiment of the present disclosure shown in FIG. 2 may be implemented by using the fuel cell cooling controlling apparatus of FIG. 1.

Therefore, referring to FIGS. 1 and 2, in step S103, in deriving of the output demand degree of the fuel cell, the first processor 20 may calculate a driver's output demand by calculating an output demand degree needed for the fuel cell by using a value of an accelerator sensor 21 of the driver, and by using a control value derived from a command of a motor control unit 22 (MCU) that controls an operational motor or a battery management system 23 that controls a high voltage battery.

When the output demand degree needed for the fuel cell is used for controlling the fuel cell cooling system as above, fuel cell cooling may be stably performed by controlling the cooling system in advance before the fuel cell generates an actual output. In addition, since the generated output of the fuel cell and a temperature of the fuel cell are closely related, the temperature of the fuel cell may be efficiently controlled in advance by performing fuel cell cooling in advance before the output of the actual reaction occurs. Therefore, it is possible to avoid a situation in which the fuel cell is momentarily deteriorated.

Meanwhile, a rate of change in output demand may be measured to be used as the output demand degree of the fuel cell. In other words, the rate of change in output demand may be measured to be used for the formula for deriving the gain value. An absolute value reflecting a required output may be used as the output demand degree needed for the fuel cell, but it is preferable to perform fuel cell cooling by considering the rate of change in output demand in an aspect of performing fuel cell cooling in advance since the output demand degree of the fuel cell varies depending on situations. For example, although a current output demand is low and the rate of change in output demand has a rising trend, it may be understood that there is a need for fuel cell cooling in the future even though the current output demand is low, thus it is necessary to prepare and increase fuel cell cooling in advance.

In addition, in steps S101, S102, and S104, the second processor 30 may derive the degradation degree of the fuel cell by using various methods. For example, by comparing an initial performance of the fuel stack stored in a memory with a current state of an I-V curve, an irreversible degradation degree may be derived in step S101, a dry out degree may be derived in step S102 as a reversible degradation degree, and a flooding degree may be derived in step S104.

In detail, referring to I-V curves shown in FIG. 3, the curves may be classified into: a part A in which a voltage rapidly drops in an initial section; a part B in which a slope of an intermediate section is small and constant; and a part C in which the voltage rapidly drops at an end section. When irreversible degradation occurs, the corresponding overall I-V curve is drooped based on an I-V curve of an initial performance, and a slope of the part B of the corresponding I-V curve in which the slope is constant is constant.

Meanwhile, when dry-out occurs during reversible degradation, a part B of the corresponding I-V curve in which a slope is constant is drooped down more than a part B of the I-V curve of the initial performance. In addition, when flooding occurs, a part C in which the voltage rapidly drops at an end section of the corresponding I-V curve is moved to the left. Therefore, the fuel cell degradation types and the degradation degree of the fuel cell may be derived by comparing the initial performance and the current state in the I-V curve. In addition, various conventional techniques such as a method of modeling an I-V curve and expressing it by an equation may be utilized.

When the degradation degree of the fuel cell is used for controlling the fuel cell cooling system, it may actively respond to short-term and long-term apparatus changes by performing fuel cell cooling according to a fuel cell state. For example, when irreversible degradation or dry-out occurs, it is possible to prevent damages due to an increase in the heat amount generated by the fuel cell, thereby preventing the acceleration performance from being limited and improving the operability. In addition, when overcooling occurs during flooding, it is possible to prevent situations where deterioration may be accelerated and it is also effective in terms of ensuring durability of the fuel cell.

In addition, in deriving of the gain value of step S200, the controller 40 may derive the gain value according to the output demand degree or the degradation degree of the fuel cell. Herein, in step S220, a rising gain value that is used for increasing the output of the cooling system may be derived as the gain value, and in step S230, a falling gain value that is used for decreasing the output of the cooling system may be derived as the gain value.

When the gain value is derived as above, there is an effect of effectively responding to apparatus changes by using the rising gain value and the falling gain value that are respectively derived rather than using a single gain value.

When an irreversible degradation degree is higher than a reference irreversible degradation degree, the output of the cooling system has to be rapidly increased, thus a rising gain value $G\_u$ is increased. When a dry-out degree is higher than a reference dry-out degree, the output of the cooling system has to be also rapidly increased, thus the rising gain value $G\_u$ is increased. However, when a flooding degree is higher than a reference flooding degree, the output of the cooling system has to be rapidly decreased, thus a falling gain value $G\_d$ is increased.

Herein, the irreversible degradation degree, the dry-out degree and the flooding degree are scaled to factors of equal to or greater than 0 and equal to or less than 1 so that the factors are used for calculating a rising gain factor $F\_di$ corresponding to the irreversible degradation degree in step S211, a rising gain factor $F\_dr$ corresponding to the dry-out degree in step S212, and a falling gain factor $F\_f$ corresponding to the flooding degree in step S214 to be used for calculating a final rising gain value and a final falling gain value in steps S220 and S230.

In step S206, when the cooling system is controlled according to the output demand degree, whether a rate of change $\Delta I$ of output demand is positive or negative is determined. When the rate of change $\Delta I$ of output demand is positive and large, the output has to be rapidly increased, thus the output of the cooling system has to be also rapidly increased. Therefore, when the rate of change $\Delta I$ of output demand is positive and large, the rising gain value is increased.

Alternatively, when the rate of change $\Delta I$ of output demand is negative and low, the output has to be rapidly decreased, thus the output of the cooling system has to be also rapidly decreased. Therefore, when the rate of change $\Delta I$ of output demand is negative and low, the falling gain value is increased.

However, although the rate of change $\Delta I$ of output demand is negative and low, when the stack temperature is high, the falling gain value is increased relatively small since ensuring cooling performance is preferential, and the output of the cooling system has to be lowered less quickly. Therefore, when the stack temperature derived by the temperature sensor 50 is higher than a preset temperature in step S216, in step S217, the falling gain value is decreased by multiplying the rate of change ΔI of output demand by a factor of equal to or greater than 0 and equal to and less than 1, or the falling gain value may be controlled by differently storing falling gain value graphs for respective temperatures.

Herein, the rate of change in output demand is also scaled to a factor of equal to or greater than 0 and equal to or less than 1 so that, in steps S213 and S215, the factor is used for calculating a rising gain factor F_iu corresponding to the rate of change in output demand in step S213 or a falling gain factor F_idt corresponding to the rate of change in output demand in step S215 to be used for calculating the final rising gain value or the final falling gain value.

However, when the rate of change ΔI of output demand is negative, in step S215, first, the rate of change ΔI of output demand is scaled to a factor F_idt of equal to or greater than 0 and equal to or less than 1. Herein, when the stack temperature is higher than a preset temperature T in step S216, a final factor F_id of the rate of change ΔI of output demand is calculating by multiplying the factor obtained by scaling the rate of change ΔI of output demand by an another factor p of equal to or greater than 0 and equal to or less than 1 in step S217. Alternatively, when the stack temperature is lower than the preset temperature T in step S216, the falling gain factor F_idt corresponding the rate of change in output demand becomes the final factor F_id of the rate of change ΔI of output demand in step S217'.

In deriving of gain value of step S200, a threshold range may be set for the output demand degree or to the degradation degree of the fuel cell so that the rising gain value and the falling gain value are changed when the rising gain value and the falling gain value exceed the threshold range. In steps S201, S211', S202, S212', S203, S213', S204, S214', S205, and S215', when the output demand degree or the degradation degree of the fuel cell does not exceed the threshold range, the rising gain value or the falling gain value is not changed.

The fuel cell cooling control apparatus may be stabilized by preventing frequent changes in the gain values by using the above steps.

The rising gain value or the falling gain value may be derived by using the following formulas:

rising gain value=rising factor×(irreversible degradation degree+dry-out degree+rate of change in output demand)+basic rising gain value; and falling gain value=falling factor×(flooding degree+ rate of change in output demand)+basic falling gain value.

Herein, the rising factor and the falling factor refer to weighed values that vary the gain value according to the irreversible degradation degree and the rate of change in output demand. When the rate of change in output demand is positive, the rate of change in output demand is applied to the formula for calculating the rising gain value. Alternatively, when the rate of change in output demand is negative, the absolute value thereof is applied to the formula for calculating the falling gain value.

In detail, in steps S220 and S230, the following formulas may be derived by using factors that are obtained by scaling the irreversible degradation degree, the dry-out degree, the flooding degree, and the rate of change in output demand that are equal to or greater than 0 and equal to or less than 1:

rising gain value $G\_u$=rising factor $W\_u\times(F\_di+F\_dr+F\_iu)$+basic rising gain value $G\_u$Base; and falling gain value $G\_d$=falling factor $W\_d\times(F\_id+F\_f)$+basic falling gain value $G\_d$Base.

In determining of the output of the cooling system of step S300, the controller 40 may determine operational RPMs of the cooling water pump and the cooling fan by using the derived gain value.

Herein, when the stack temperature derived by the temperature sensor 50 is higher than a target temperature, a rising gain value G_u may be applied since the output of the cooling system has to be increased. Alternatively, when the derived stack temperature is lower than the target temperature, a falling gain value G_d may be applied since the output of the cooling system has to be decreased.

The RPM of the cooling system may be determined by using a PI control or by using the following formula:

RPM instruction=previous RPM instruction+gain value×(derived present stack temperature−target stack temperature).

Herein, the rising gain value is substituted when the derived current stack temperature is higher than the target stack temperature, or, the falling gain value is substituted when the derived current stack temperature is lower than the target stack temperature.

In controlling of the cooling system of step S400, the controller 40 controls the cooling water pump and the cooling fan by using the determined RPM instruction values.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of controlling fuel cell cooling, the method comprising:
    deriving an output demand degree of a fuel cell or a degradation degree of the fuel cell;
    deriving a gain value according to the derived output demand degree of the fuel cell or the degradation degree of the fuel cell for controlling a cooling system that performs fuel cell cooling and includes a cooling water pump and a cooling fan, wherein the gain value is configured with a rising gain value and a falling gain value that are applied for increasing and decreasing the output of the cooling system, respectively;
    determining an output of the cooling system by applying the derived gain value;
    controlling an RPM of the cooling water pump or the cooling fan of the cooling system according to the determined output to remove heat generated in the fuel cell; and
    deriving a stack temperature of the fuel cell before the deriving a gain value,
    wherein in the determining an output of the cooling system, the rising gain value is applied when the derived stack temperature is higher than a target temperature, and the falling gain value is applied when the derived stack temperature is lower than the target temperature.

2. The method of claim 1, wherein the deriving of the degradation degree of the fuel cell includes deriving a reversible degradation degree and an irreversible degradation degree, and the deriving of the gain value includes deriving the gain value by independently using the reversible degradation degree and the irreversible degradation degree.

3. The method of claim 2, wherein the deriving of the gain value includes increasing a rising gain value that is applied for increasing the output of the cooling system as the derived irreversible degradation degree increases.

4. The method of claim 2, wherein the deriving of the degradation degree of the fuel cell includes: deriving a dryout degree as the reversible degradation degree, and the deriving of the gain value includes: increasing a rising gain value that is applied for increasing the output of the cooling system as the derived dry-out degree increases.

5. The method of claim 2, wherein the deriving of the fuel cell degradation degree of the fuel cell includes: deriving a flooding degree as the reversible degradation degree, and the deriving of the gain value includes: increasing a falling gain value that is applied for decreasing the output of the cooling system as the derived flooding degree increases.

6. The method of claim 1, wherein the deriving of the gain value includes: deriving a rate of change in output demand as the output demand degree of the fuel cell; and increasing a rising gain value that is applied for increasing the output of the cooling system as the derived rate of change in the output demand increases.

7. The method of claim 1, wherein the deriving of the gain value includes: deriving a rate of change in output demand as the output demand degree of the fuel cell; and increasing a falling gain value that is applied for decreasing the output of the cooling system as the derived rate of change in the output demand increases.

8. The method of claim 7, further comprising:
deriving a stack temperature of the fuel cell before the deriving of the gain value,
wherein when the derived stack temperature is higher than a preset temperature, the falling gain value is increased relatively less than when the derived stack temperature is lower than the preset temperature.

9. The method of claim 1, wherein in the deriving of the gain value, the gain value is changed when the derived output demand degree of the fuel cell or the degradation degree of the fuel cell exceeds a predetermined threshold range.

10. The method of claim 1, wherein the gain value is configured with a rising gain value that is applied for increasing the output of the cooling system and a falling gain value that is applied for decreasing the output of the cooling system, and the rising gain value and the falling gain value are derived by using the following formulas:

$$\text{rising gain value} = \text{rising factor} \times (\text{irreversible degradation degree} + \text{dry-out degree} + \text{rate of change in output demand}) + \text{basic rising gain value};$$

$$\text{falling gain value} = \text{falling factor} \times (\text{flooding degree} + \text{rate of change in output demand}) + \text{basic falling gain value};$$

wherein the rising factor and the falling factor refer to weighted values that vary the gain value according to the irreversible/reversible degradation degrees and the rate of change in output demand, and when the rate of change in output demand is positive, the rate of change in output demand is applied to the formula for calculating the rising gain value, and when the rate of change in output demand is negative, the absolute value thereof is applied to the formula for calculating the falling gain value.

11. An apparatus for controlling fuel cell cooling, the apparatus comprising:
a cooling system configured to heat up or cool down a fuel cell and including a cooling water pump and a cooling fan;
a first processor configured to derive an output demand degree of the fuel cell;
a second processor configured to derive a degradation degree of the fuel cell; and
a controller configured to derive a gain value according to the derived output demand degree of the fuel cell or the degradation degree of the fuel cell for controlling the cooling system that cools down the fuel cell, determining an output of the cooling system by using the derived gain value, and controlling an RPM of the cooling water pump or the cooling fan of the cooling system according to the determined output to remove heat generated in the fuel cell.

12. The apparatus of claim 11, further comprising a temperature sensor configured to derive a stack temperature of the fuel cell.

* * * * *